United States Patent [19]
Brooks, Jr. et al.

[11] 3,946,828
[45] Mar. 30, 1976

[54] SLANTBACK, COMPLIANT SURFACE EFFECT VEHICLE SKIRT

[75] Inventors: Eugene N. Brooks, Jr., Sterling, Va.; Allen G. Ford, Rockville, Md.

[73] Assignee: The United States of America as represented by the Secretary of the Navy, Washington, D.C.

[22] Filed: June 17, 1974

[21] Appl. No.: 479,740

[52] U.S. Cl. .............................. 180/128; 180/121
[51] Int. Cl.² .......................................... B60V 1/16
[58] Field of Search ........... 180/121, 127, 128, 116, 180/117, 118, 123

[56] References Cited
UNITED STATES PATENTS

| | | | |
|---|---|---|---|
| 3,297,102 | 1/1967 | Cockerell | 180/127 X |
| 3,362,499 | 1/1968 | Tripp | 180/121 |
| 3,362,500 | 1/1968 | Bliss | 180/128 |
| 3,382,945 | 5/1968 | Bertin et al. | 180/121 |
| 3,420,330 | 1/1969 | Bliss | 180/121 |
| 3,515,238 | 6/1970 | Knuth et al. | 180/121 |
| 3,770,079 | 11/1973 | Wheeler et al. | 180/127 |

FOREIGN PATENTS OR APPLICATIONS

| | | | |
|---|---|---|---|
| 203,252 | 3/1966 | Sweden | 180/128 |

Primary Examiner—Kenneth H. Betts
Attorney, Agent, or Firm—R. S. Sciascia; Q. E. Hodges; D McGiehan

[57] ABSTRACT

The skirt of a surface effects vehicle is made up of a plurality of oblong elements which are slanted toward the stern of the vessel. Each element partially rests against and/or supports the adjacent elements. This configuration reduces skirt drag, cushion leakage, skirt wear, as well as reducing the impact forces transmitted to the vehicle itself and increases obstacle heights which can be successfully crossed.

1 Claim, 2 Drawing Figures

SLANTBACK, COMPLIANT SURFACE EFFECT VEHICLE SKIRT

The invention described herein may be manufactured and used by or for the Government of the United States of America for governmental purposes without the payment of any royalties thereon or therefore.

BACKGROUND OF THE INVENTION

Prior art Surface Effects Vehicle skirts have been generally large unitary bag-like appendages which were inflated to retain the cushion air. The bag-cell incorporated large amounts of air volume within the bags which would not easily move out of the way of obstacles. They were also virtually incapable of deflating in order to reduce drag across obstacles. The bag-cell was adapted by extending less rigid segments of material which were fixed to each other and arced into the cushion to reduce drag but maintain the air cushion. For an example, see U.S. Pat. No. 3,770,079 issued on Nov. 6, 1973 to Wheeler et al.

Another approach to the air cushion vehicle attempted to permit localized deflation of the air cushion containing skirt by providing multiple cell arrangements which are attached across the underbody of the craft. While permitting localized deflation this concept increased drag by increasing the number of skirts that would have to pass over an obstacle. Sophisticated and complex mechanisms had to be devised to selectively retract individual cushions of the multiple cushion arrangement as shown by U.S. Pat. No. 3,515,238 issued on June 2, 1970 to Knuth et al.

Clearly a skirt was needed which reduced drag and skirt wear due to passage over obstacles. It was also desirable that the skirt be as compliant to the terrain as possible so that the vehicle would be habitable for extended periods and so that the skirt would minimize air escape from the cushion.

OBJECTS OF THE INVENTION

It is an object of the invention to provide an improved Surface Effects Vehicle skirt which permits higher obstacle clearance, reduce skirt drag, improve habitability and ride quality, reduce cushion leakage and reduce skirt wear.

Summary of The Invention

Briefly, the skirt configuration of this invention provides a Surface Effects Vehicle skirt which has low drag characteristics and conforms to the terrain with a minimum of cushion air loss. It comprises a plurality of elements which are air inflated. Each element is attached to the main body of the vehicle and is otherwise independently suspended with respect to the other elements. Each element is oblong shaped as shown in both FIGS. 1 and 2 with its main cross-sectional axis in the beam wise direction of the vehicle. Each element is fully or partially open at the bottom and is fed air from the top where it is attached to the vehicle body. The elements slant rearwardly from top to bottom at an angle shown in FIG. 1, to deflect easily upon encountering an obstacle. Also, and very importantly, the slant angle permits mutual support of one element by adjacent elements. The cross-section of the elements are tapered from top to bottom as shown best in FIG. 2 wherein the larger ovals are the tops and the smaller ovals are the bottoms of the skirt elements. This taper is most satisfactory if the decrease in width from top to bottom of the element is in the beamwise direction only.

DESCRIPTION OF THE PREFERRED EMBODIMENT

Figure 1:
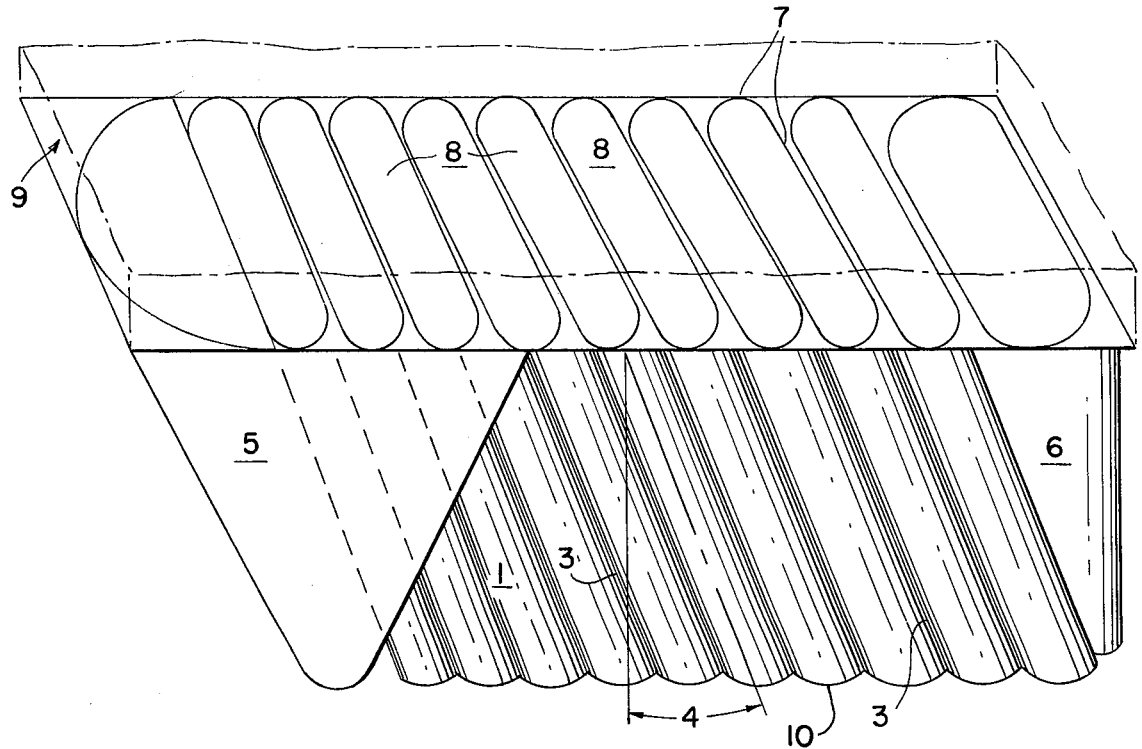
FIG. 1 is a side view of the skirt of this invention.

In FIG. 1, each element 1 is in a frictional sealing engagement with adjacent elements. This engagement among elements is only frictional where their respective material is juxtaposed at lines 3. This permits the elements to deflate or deflect in the beamwise direction freely and independently. The elements are air fed in their open tops 8 and are open fully or partially at their bottoms 10 against the terrain, and are therefore tube-like from top to bottom at the point of attachment 7 to the vehicle 9. A semiconical front element 5 and a closed rear bag 6 are provided to support the first and last element respectively.

Figure 2:
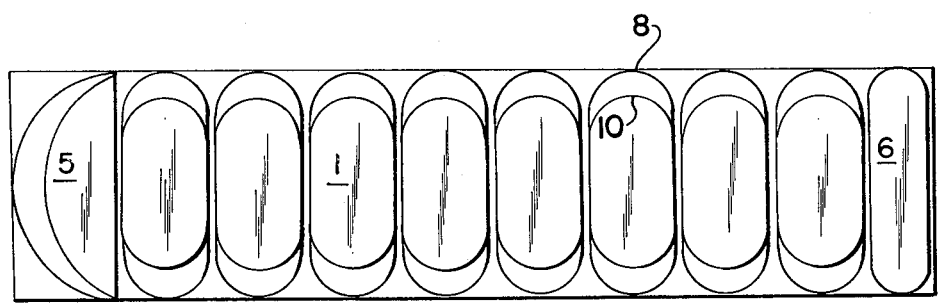
FIG. 2 is the top view of the skirt taken at a slant angle down the inside and perpendicular to the centerline of the elements of this invention.

As the elements of the skirt traverse obstacles they deflect in two ways. First, they deflate and deflect into themselves vertically with the deflation initiated at the bottom of the cell since the bottoms 10 are open except for being subject to being pressed against the terrain. Second, they bend either along the primary axis of the vehicle, fore and aft, or along the secondary axis of the vessel or some combination of the two. Experiments have shown the first mode of deflection to be dominant. It is also the most compliant and least drag producing mode. Since each of the elements is slanted in the rearward direction at an angle 4, and tapered from top to bottom, the element material does not snag transversed obstacles. As the elements pass over obstacles they reinflate quickly to cut off air leakage so that the skirt conforms to the terrain with very little cushion leakage. FIG. 2, taken at the slant angle 4, and thereby perpendicular to the centerline of the elements 1, shows an internal view of the elements 1, indicating a taper from top 8 to the bottom 10.

The bottom of the elements may be indented at the midpoint of the cross-section to decrease the drag of the elements 1.

Obviously many modifications and variations of the present invention are possible in the light of the above teachings. It is therefore to be understood that within the scope of the appended claims the invention may be practiced otherwise than as specifically described.

What is claimed is:

1. A surface effects vehicle skirt, comprising:
   a multiplicity of air-inflatable tube-like elements each having a top end and a bottom free end wherein said elements are attached to said surface effects vehicle at the top end and wherein each of said elements is free to move independently of the other elements and free to deflate independently of the other elements and engage by friction only the next foreward adjacent element and the next rearward adjacent element and wherein each element is at a slant angle with the vertical rearward from top to bottom of the element and each element lies above a forward adjacent element and frictionally engages said forward adjacent element and inturn supports the next rearward adjacent element by frictional engagement so that the multiplicity of elements at least partially define one or more cushions of pressurized gas beneath the vehicle; and
a semi-conical front element and a closed rear bag to support the first and last elements, respectively.

* * * * *